(12) United States Patent
Lee et al.

(10) Patent No.: US 11,250,308 B2
(45) Date of Patent: Feb. 15, 2022

(54) APPARATUS AND METHOD FOR GENERATING PREDICTION MODEL BASED ON ARTIFICIAL NEURAL NETWORK

(71) Applicants: Seoul National University R&DB Foundation, Seoul (KR); eCubesolutions Co., Ltd., Seoul (KR)

(72) Inventors: Jung Woo Lee, Seoul (KR); Hyeung Ill Lee, Seoul (KR)

(73) Assignees: Seoul National University R&DB Foundation, Seoul (KR); eCubesolutions Co., Ltd., Seoul (KR)

( * ) Notice: Subject to any disclaimer, the term of this patent is extended or adjusted under 35 U.S.C. 154(b) by 936 days.

(21) Appl. No.: 15/609,593

(22) Filed: May 31, 2017

(65) Prior Publication Data

US 2017/0351948 A1    Dec. 7, 2017

(30) Foreign Application Priority Data

Jun. 1, 2016    (KR) .......................... 10-2016-0068326

(51) Int. Cl.
G06N 3/04    (2006.01)
G06N 3/08    (2006.01)

(52) U.S. Cl.
CPC .............. *G06N 3/04* (2013.01); *G06N 3/084* (2013.01)

(58) Field of Classification Search
CPC .......... G06N 20/00; G06N 3/04; G06N 3/084; G06Q 30/0254
See application file for complete search history.

(56) References Cited

U.S. PATENT DOCUMENTS 6,922,680 B2    7/2005   Buczak
2016/0364327 A1*  12/2016  Reinwald ................ G06F 17/16

FOREIGN PATENT DOCUMENTS

| KR | 10-2004-0043911 A | 5/2004 |
| KR | 10-2010-0052896 A | 5/2010 |
| KR | 10-1319647 B1 | 10/2013 |

OTHER PUBLICATIONS

Priddy et al., "Data Normalization" in Artificial Neural Networks: An Introduction (Ch. 3.) SPIE Tutorial Texts in Optical Engineering, vol. TT68. Aug. 2005 (Year: 2005).*

(Continued)

*Primary Examiner* — Miranda M Huang
*Assistant Examiner* — Yao David Huang
(74) *Attorney, Agent, or Firm* — NSIP Law

(57) ABSTRACT

Disclosed is an apparatus for generating an artificial-neural-network-based prediction model. The apparatus includes an input data conversion unit configured to convert input data of an L-dimensional array (L is a natural number) into normalized vector data and input the normalized vector data, a modeling unit configured to model an artificial-neural-network-based prediction model for learning the input vector data and output a value predicted through the modeling, and an adjustment unit configured to compare the value predicted by the modeling unit with an actually measured value to calculate an error value and adjust learning parameters of an artificial neural network using the error value and a back-propagation algorithm.

18 Claims, 13 Drawing Sheets

USER-ITEM ARRAY

|  | Item$_1$ | Item$_2$ | Item$_3$ | Item$_4$ | Item$_5$ |
|---|---|---|---|---|---|
| User$_1$ | 5 | - | - | - | 1 |
| User$_2$ | - | 3 | - | 2 | - |
| User$_3$ | - | - | 2 | 3 | - |
| User$_4$ | - | 1 | - | - | - |

(a)

USER NORMALIZATION ARRAY

|  | Item$_1$ | Item$_2$ | Item$_3$ | Item$_4$ | Item$_5$ |
|---|---|---|---|---|---|
| User$_1$ | 12.5 | - | - | - | 2.5 |
| User$_2$ | - | 7.5 | - | 5 | - |
| User$_3$ | - | - | 5 | 7.5 | - |
| User$_4$ | - | 5 | - | - | - |

(b)

ITEM NORMALIZATION ARRAY

|  | Item$_1$ | Item$_2$ | Item$_3$ | Item$_4$ | Item$_5$ |
|---|---|---|---|---|---|
| User$_1$ | 20 | - | - | - | 4 |
| User$_2$ | - | 6 | - | 4 | - |
| User$_3$ | - | - | 8 | 6 | - |
| User$_4$ | - | 2 | - | - | - |

(c)

User$_u$

NEURAL NETWORK INPUT

Item$_i$

(56) References Cited

OTHER PUBLICATIONS

Sharma et al., Symmetric Collaborative Filtering Using the Noisy Sensor Model in Proceedings of the Seventeenth Conference on Uncertainty in Artificial Intelligence (UAI2001), ArXiv reprint: arXiv:1301.2309 [cs.IR] (2013). Retrieved from: <https://arxiv.org/ftp/arxiv/papers/1301/1301.2309.pdf> (Year: 2013).*
Srivastava et al., "Dropout: A Simple Way to Prevent Neural Networks from Overfitting." Journal of Machine Learning Research 15 (2014) 1929-1958 (Year: 2014).*
Ioffe, Batch Normalization: Accelerating Deep Network Training by Reducing Internal Covariate Shift, arXiv: 1502.03167 [cs.LG] (2015). Retrieved Mar. 10, 2020. Retrieved from: <https://arxiv.org/abs/1502.03167> (Year: 2015).*
Tang et al., User Modeling with Neural Network for Review Rating Prediction, Proceedings of the Twenty-Fourth International Joint Conference on Artificial Intelligence (IJCAI 2015) (Year: 2015).*
Kim et al., "Collaborative Filtering for Recommendation Using Neural Networks," ICCSA 2005, LNCS 3480, pp. 127-136, 2005 (Year: 2005).*
Strub et al., "Hybrid Collaborative Filtering with Neural Networks," arXiv: 1603.00806v2 [cs.IR] Mar. 9, 2016 (Year: 2016).*
Ioffe, Sergey, et al. "Batch Normalization: Accelerating Deep Network Training by Reducing Internal Covariate Shift". Proceedings of the 32nd International Conference on Machine Learning, Lille, France, 2015 (9 pages in English).
Junlin, Zhang, et al. "A Distributional Representation Model for Collaborative Filtering". Cornell University Library, arXIV preprint arXIV: 1502.04163. Feb. 14, 2015 (6 pages in English).
Jayalakshmi, T. et al., "Statistical Normalization and Back Propagation for Classification", *International Journal of Computer Theory and Engineering*, vol. 3, Issue 1, Feb. 2011 (pp. 1793-8201).
Extended European Search Report dated Jun. 7, 2019 in counterpart European Patent Application No. 17807041.3 (8 pages in English).

* cited by examiner

FIG. 7A

|    | I1 | I2 | I3 | I4 | I5 | I6 | I7 |
|----|----|----|----|----|----|----|----|
| U1 | 2  | 0  | 5  | 0  | 1  | 2  | 1  |
| U2 | 5  | 0  | 0  | 1  | 0  | 0  | 0  |
| U3 | 0  | 2  | 1  | 3  | 3  | 5  | 3  |
| U4 | 0  | 0  | 0  | 0  | 2  | 0  | 0  |
| U5 | 3  | 0  | 5  | 0  | 0  | 1  | 0  |
| U6 | 2  | 0  | 0  | 1  | 0  | 5  | 0  |
| U7 | 3  | 0  | 5  | 0  | 0  | ?  | 2  |

|    | I1 | I2 | I3 | I4 | I5 | I6 | I7 |
|----|----|----|----|----|----|----|----|
| U1 | 2  | 0  | 5  | 0  | 1  | 2  | 1  |
| U2 | 5  | 0  | 0  | 1  | 0  | 0  | 0  |
| U3 | 0  | 2  | 1  | 3  | 3  | 5  | 3  |
| U4 | 0  | 0  | 0  | 0  | 2  | 0  | 0  |
| U5 | 3  | 0  | 5  | 0  | 0  | 1  | 0  |
| U6 | 2  | 0  | 0  | 1  | 0  | 5  | 0  |
| U7 | 3  | 0  | 5  | 0  | 0  | 0  | 2  |

720

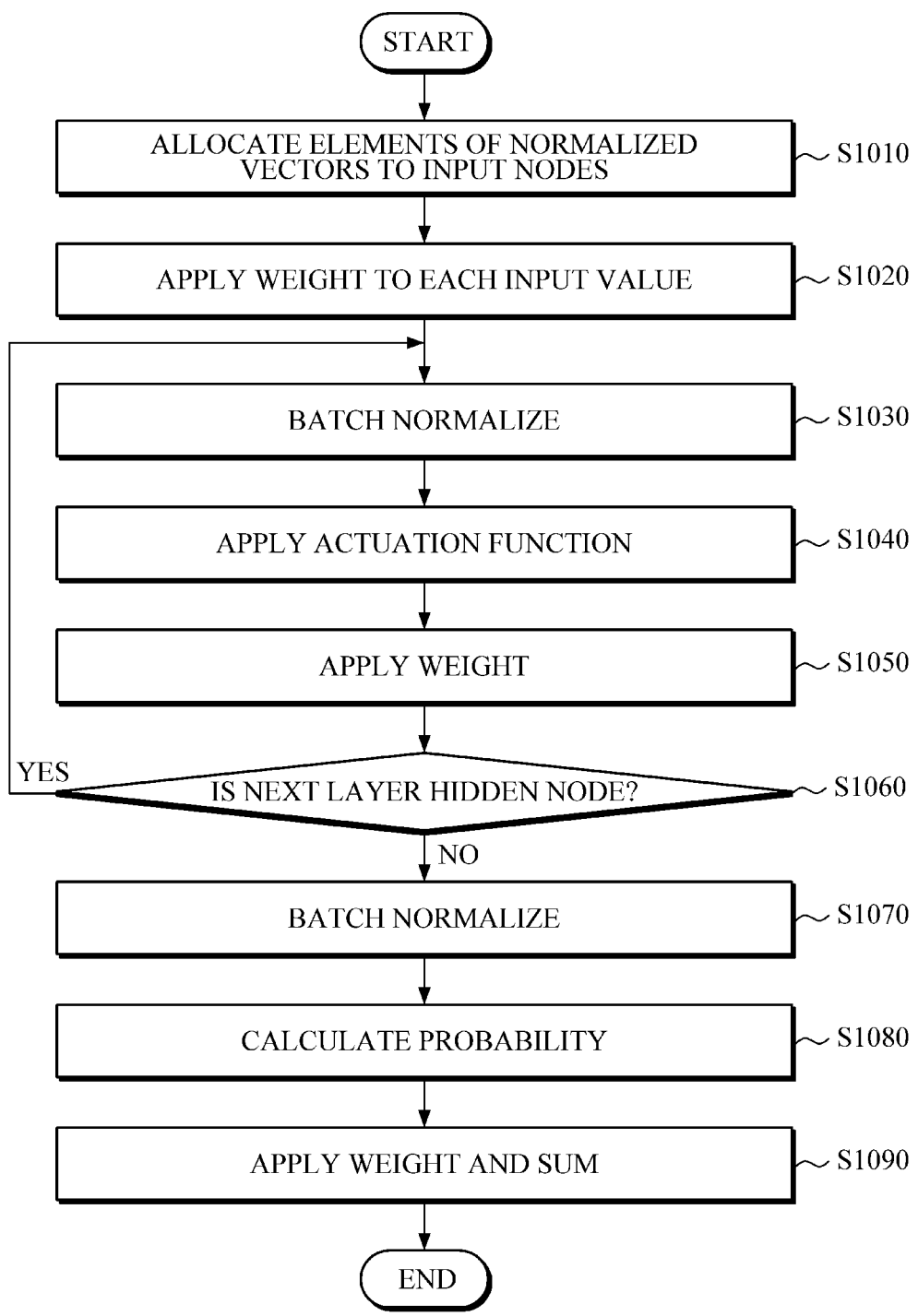

APPARATUS AND METHOD FOR GENERATING PREDICTION MODEL BASED ON ARTIFICIAL NEURAL NETWORK

CROSS-REFERENCE TO RELATED APPLICATION(S)

This application claims priority from Korean Patent Application No. 10-2016-0068326, filed on Jun. 1, 2016, in the Korean Intellectual Property Office, the disclosure of which is incorporated herein by reference in its entirety.

BACKGROUND

1. Field

The following description relates to artificial neural network technology, and more particularly, to an apparatus and method for processing data to be input to an artificial neural network, receiving the processed data, and modeling the received data on the basis of the artificial neural network.

2. Description of Related Art

A collaborative filtering algorithm, which is one of prediction technologies, is a technique used by recommender systems and is also a technique of predicting an evaluation of an item on the basis of previous evaluations of users about other items. The algorithm has been attracting attention since the Netflix Prize, which is a competition that ran from 2007 to 2009, and has been applied in various forms by many companies in the world such as Amazon, YouTube, and Google.

Pre-existing collaborative filtering algorithms include methods such as Baseline Predictor, matrix factorization, and kNN. For these methods, a model is too simple to show excellent performance.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

The following description relates to an apparatus and method for implementing a prediction model, such as collaborative filtering, using an artificial neural network to ensure excellent performance.

The following description also relates to an apparatus and method for normalizing input data to compensate for the form imbalance of data input through an artificial neural network.

The following description also relates to an apparatus and method for solving an overfitting problem of a model that uses an artificial neural network, which is an algorithm used to generate a collaborative filtering model.

The following description also relates to an apparatus and method suitable for processing data in real time by simply performing rating prediction using a pre-learned model.

In one general aspect, an apparatus for generating an artificial-neural-network-based prediction model includes an input data conversion unit configured to convert input data of an L-dimensional array (a tensor) (L is a natural number) into normalized vector data and input the normalized vector data, a modeling unit configured to model an artificial-neural-network-based prediction model for learning the input vector data and output a value predicted through the modeling, and an adjustment unit configured to compare the value predicted by the modeling unit with an actually measured value to calculate an error value and adjust learning parameters of an artificial neural network using the error value and a back-propagation algorithm.

The input data conversion unit may include an input data normalization unit configured to normalize L vectors corresponding to predetermined element values of the L-dimensional array (L is a natural number) and a normalization vector input processing unit configured to input the L vectors to the artificial neural network.

The input data normalization unit may perform the normalization by multiplying the number of elements of each of the L vectors by a length of each of the vectors divided by the number of non-zero elements.

The normalization vector input processing unit may input a row vector formed by sequentially connecting the L vectors to the artificial neural network.

The modeling unit may allow batch normalization for normalizing a data distribution between an input layer and a hidden layer of the artificial neural network, between hidden layers of the artificial neural network, and between the hidden layer and an output layer of the artificial neural network to be performed at least one or more times.

The modeling unit may calculate an average of input values, calculate a variance of the input values by using the average, find normalized values by using the variance, and calculate batch-normalized values by scaling and shifting the normalized values.

The modeling unit may apply a non-linear function to the batch-normalized values in the hidden layer.

The modeling unit may apply a softmax function to the batch-normalized values in the output layer to calculate a probability of each rating and may output the predicted value by applying weights to the values and summing the values.

The apparatus may further include a control unit configured to, when the artificial-neural-network-based prediction model is modeled and then additional data is input, control the input data conversion unit and the modeling unit to generate an expansive L-dimensional array (L is a natural number) obtained by adding the additional data to the input data and output a predicted value as L vectors corresponding to element values included in additional data intended to be predicted by the L-dimensional array, wherein the L vectors corresponding to the additional data have the same size as L vectors corresponding to the input data.

The apparatus may further include a control unit configured to, when the artificial-neural-network-based prediction model is modeled and then additional data is input, control the input data conversion unit, the modeling unit, and the adjustment unit to generate an L-expansive dimensional array (L is a natural number) obtained by adding the additional data to the input data and additionally learn the prediction model with L vectors corresponding to element values included in the additional data intended to be learned by the L-dimensional array, wherein the L vectors corresponding to the additional data have the same size as L vectors corresponding to the input data.

In another general aspect, an apparatus for converting data to be input to an artificial neural network includes an input data normalization unit configured to normalize L vectors corresponding to predetermined element values of an L-dimensional array (a tensor) (L is a natural number) and a normalization vector input processing unit configured to input the L vectors to the artificial neural network.

The input data normalization unit may perform the normalization by multiplying the number of elements of each of the L vectors by a length of each of the vectors divided by the number of non-zero elements.

The normalization vector input processing unit may input a row vector formed by sequentially connecting the L vectors to the artificial neural network.

In another general aspect, a method of generating an artificial-neural-network-based prediction model includes converting input data of an L-dimensional array (a tensor) (L is a natural number) into normalized vector data, modeling an artificial-neural-network-based prediction model for learning input vector data and outputting a value predicted through the modeling, and comparing the value predicted by the modeling unit with an actually measured value to calculate an error value and adjusting learning parameters of an artificial neural network using the error value and a back-propagation algorithm.

In another general aspect, a method of converting data to be input to an artificial neural network includes normalizing L vectors corresponding to predetermined element values of an L-dimensional array (a tensor) (L is a natural number) and inputting the L vectors to the artificial neural network.

Other features and aspects will be apparent from the following detailed description, drawings, and claims.

BRIEF DESCRIPTION OF THE DRAWINGS

FIG. 7A is a diagram showing an example of prediction using additional data according to the present invention.

FIG. 7B is a diagram showing an example of learning using additional data according to the present invention.

FIGS. 10A and 10B are flowcharts for illustrating an artificial-neural-network-based modeling method according to an embodiment of the present invention.

Figure 1:
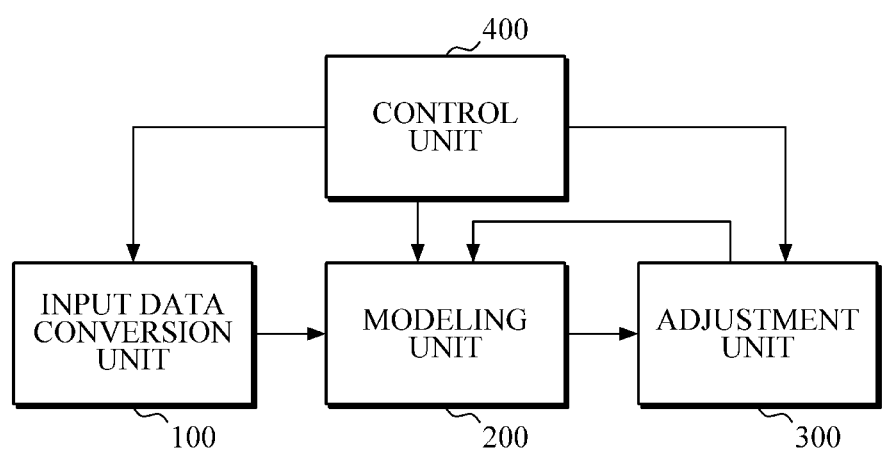
FIG. 1 is a block diagram of an artificial-neural-network-based prediction model generation apparatus according to an embodiment of the present invention.

Throughout the drawings and the detailed description, unless otherwise described, the same drawing reference numerals should be understood as referring to the same elements, features, and structures. The relative size and depiction of these elements may be exaggerated for clarity, illustration, and convenience.

DETAILED DESCRIPTION

The advantages and features of the present invention and implementation methods thereof will be clarified through the following embodiments described with reference to the accompanying drawings. However, the present invention may be embodied in different forms and is not to be construed as limited to the embodiments set forth herein. Rather, these embodiments are provided so that this disclosure will be thorough and complete and will fully convey the scope of the present invention to those skilled in the art. Like reference numerals refer to like elements throughout.

In the following description, when detailed descriptions of relevant known functions or configurations are determined to unnecessarily obscure important points of the present invention, the detailed descriptions will be omitted. Also, terms used herein are defined in consideration of the functions of the present disclosure and may be changed depending on a user, an intent of an operator, or a custom. Accordingly, the terms should be defined on the basis of the following overall description of this specification.

It should be understood that each block of flowchart illustrations and/or block diagrams and combinations of blocks in the flowchart illustrations and/or block diagrams, can be implemented by computer program instructions (execution engines). These computer program instructions may be provided to a processor of a general purpose computer, a special purpose computer, or another programmable data processing apparatus to produce a machine, such that the instructions, which are executed via the processor of the computer or the other programmable data processing apparatus, creates a means for implementing the functions/acts specified in the flowchart and/or block diagram block or blocks.

These computer program instructions may also be stored in a computer readable storage medium that can direct a computer, a programmable data processing apparatus, and/or other devices to function in a particular manner such that a computer readable storage medium having instructions stored therein comprises a manufactured article including instructions which implement aspects of the function/act specified in the flowchart and/or block diagram block or blocks.

The computer program instructions may also be loaded onto a computer, another programmable data processing apparatus, or another device to cause a series of operational steps to be performed on the computer, the other programmable apparatus, or the other device to produce a computer implemented process such that the instructions which are executed on the computer, the other programmable apparatus, or the other device implement the functions/acts specified in the flowchart and/or block diagram block or blocks.

In this regard, each block in a flowchart or block diagram may represent a module, segment, or portion of instructions which comprise one or more executable instructions for implementing a specified logical function(s). In some alternative implementations, the functions noted in the block may occur out of an order noted in the figures. For example, two blocks shown in succession may actually be substantially concurrently executed, or the blocks may sometimes be executed in a reversed order depending upon a functionality involved.

Hereinafter, embodiments of the present invention will be described in detail with reference to the accompanying drawings. However, the present invention may be embodied in different forms and is not to be constructed as limited to the embodiments set forth herein. Rather, these embodiments are provided so that this disclosure will be thorough and complete and will fully convey the scope of the present invention to those skilled in the art.

FIG. 1 is a block diagram of an artificial-neural-network-based prediction model generation apparatus according to an embodiment of the present invention. For convenience of description, generation of a collaborative filtering model based on an artificial neural network will be described, but the generation is merely an example. The present invention is not limited to the generation of a collaborative filtering model. That is, a technology for generating an artificial-neural-network-based prediction model to be described below may be applied to technical fields other than collaborative filtering.

Referring to FIG. 1, an artificial-neural-network-based prediction model generation apparatus 100 includes an input data conversion unit 100, a modeling unit 200, an adjustment unit 300, and a control unit 400.

First, the input data conversion unit 100 inputs input data for generating a collaborative filtering model to the modeling unit 200. In this case, the input data may be stored in a database (not shown) that is installed separately from the artificial-neural-network-based prediction model generation apparatus 100 or in a storage unit (not shown) included in the artificial-neural-network-based prediction model generation apparatus 100. Alternatively, the artificial-neural-network-based prediction model generation apparatus 100 may receive a plurality of pieces of input data from a remote server over the Internet.

According to an embodiment of the present invention, the input data conversion unit 100 converts input data of an L-dimensional array (a tensor) into a normalized vector and inputs the normalized vector to the modeling unit 200. For example, the input data conversion unit 100 converts each element of an array consisting of scores obtained by users evaluating items into a user vector and an item vector and inputs the user vector and the item vector to the modeling unit 200. In this case, since a different number of items are evaluated by each user and also each item is evaluated by a different number of users, the input data conversion unit 100 normalizes each user vector and each item vector in order to compensate for such an imbalance. This will be described in detail below with reference to FIGS. 2 and 3.

The modeling unit 200 receives the normalized vectors from the input data conversion unit 100 and generates a prediction model by using an artificial neural network algorithm. According to an embodiment of the present invention, a batch normalization technique is used to prevent overfitting of the input data. That is, the modeling unit 200 is composed of an input layer, a hidden layer, and an output layer of the artificial neural network. The batch normalization is performed between the input layer and the hidden layer, between hidden layers, and between the hidden layer and the output layer at least one or more times. The modeling unit 200 will be described in detail with reference to FIG. 4.

The adjustment unit 300 compares an output value that is output by the modeling unit 200 with an actually measured value to calculate an error value, and adjusts a learning parameter of the modeling unit 200 using the error value and a back-propagation algorithm. This will be described below in detail with reference to FIG. 5.

When learning data is input, the control unit 400 controls the input data conversion unit 100, the modeling unit 200, and the adjustment unit 300 to generate a prediction model. When the prediction model is generated, the control unit 400 controls the input data conversion unit 100 and the modeling unit 200 to output predicated data. Also, when the prediction model is modeled and additional data is input, the control unit 400 controls the input data conversion unit 100 and the modeling unit 200 to output the predicted data or controls the input data conversion unit 100, the modeling unit 200, and the adjustment unit 300 to additionally learn the prediction model. This will be described in detail below with reference to FIGS. 6, 7A, and 7B.

Figure 2:
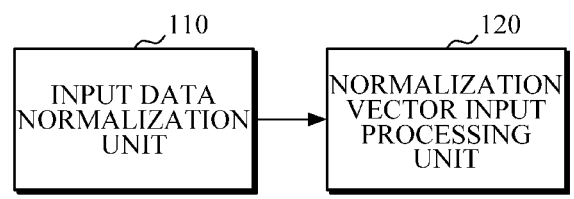
FIG. 2 is a detailed block diagram of an input data conversion unit according to an embodiment of the present invention.

FIG. 2 is a detailed block diagram of an input data conversion unit according to an embodiment of the present invention. Here, the input data conversion unit 100 is described as an element of the artificial-neural-network-based prediction model generation apparatus, but the input data conversion unit 100 may be separately configured as an artificial-neural-network input data conversion apparatus for processing input data of an artificial neural network.

Referring to FIG. 2, the input data conversion unit 100 includes an input data normalization unit 110 and a normalization vector input processing unit 120.

The input data normalization unit 110 normalizes L vectors corresponding to predetermined element values of an L-dimensional array (a tensor) (here, L is a natural number), which is learning data. For convenience of description, input data of a two-dimensional array will be described below as an example. However, this description is for the sake of understanding, and the present invention is not limited thereto. That is, even when an input data array is expanded to a three-dimensional or a higher-dimensional array, the following description may be applied as the scope of the present invention.

First, learning data consisting of scores obtained by users evaluating items to perform collaborative filtering will be described as an example. Here, when the number of users is N and the number of items of M, each of the users evaluates (rates) scores $(1, 2, \ldots, K)$ of some of the items. Thus, it is possible to obtain the following sparse array $R \in R^{N \times M}$. Elements constituting such an N×M array may be defined by Equation (1).

$$R_{u,i} = \begin{cases} r_{u,i}: & \text{when an Item}(i) \text{ is evaluated by a user}(u) \\ 0: & \text{when an Item}(i) \text{ is not evaluated by a user}(u) \end{cases} \quad [\text{Equation 1}]$$

Here, the collaborative filtering is for predicting scores that are not evaluated on the basis of given values $r_{u,i}$. Also, a vector of rating scores that are defined by Equation (1) and assigned to all of the items by one user is referred to as a user vector of the user. That is, vectors of the users are referred to as user vectors $U_1, U_2, \ldots, U_N$ and vectors of the items are referred to as item vectors $I_1, I_2, \ldots, I_M$. However, there may be an imbalance in that each user evaluates a different number of items and a different number of users evaluate each item. Accordingly, the input data normalization unit 110 according to an embodiment of the present invention normalizes user vectors $U_u$ and item vectors $I_i$ by using the following Equation (2).

$$\frac{M \cdot U_u}{\|U_u\|_0}, \frac{N \cdot I_i}{\|I_i\|_0} \quad [\text{Equation 2}]$$

In Equation (2), $\|\cdot\|_0$ refers to the number of non-zero elements, that is, the number of ratings. That is, the total number of elements of the vector is multiplied by a length of the vector divided by the number of non-zero elements. For example, when the number of users is 4 and the number of items is 5, normalization is performed as shown in FIG. 3 to be described below.

Figure 3:
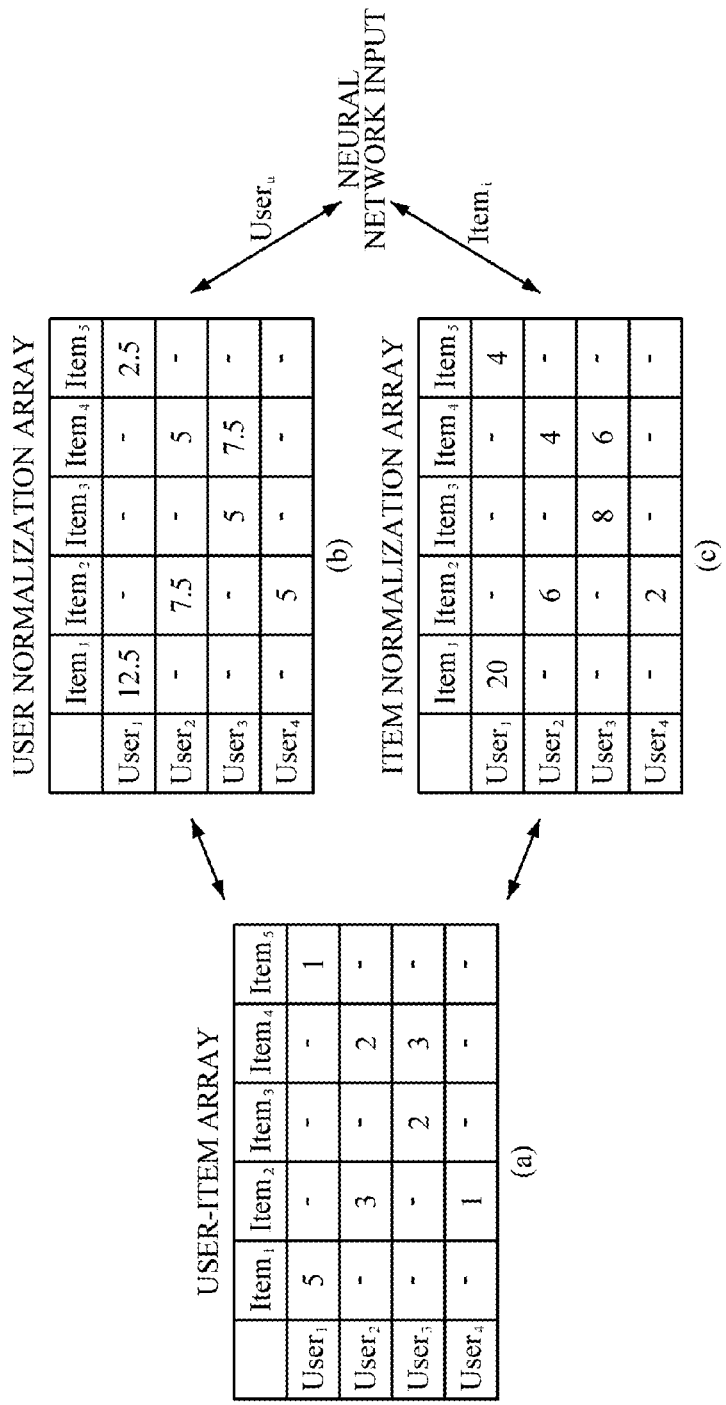
FIG. 3 is a diagram for illustrating an example of normalizing input data for generating a collaborative filtering model according to the present invention.

FIG. 3 is a diagram for illustrating an example of normalizing input data for generating a collaborative filtering model according to the present invention.

Referring to (a) of FIG. 3, a user-item array of score data evaluated by four users for five items is shown. Here, user1, user2, user3, and user4, which are shown at the left side, refer to identifiers of the users. Item1, Item2, Item3, Item4, and Item5, which are shown at the top, refer to identifiers of the items. The numbers positioned between the users and the items refer to rating scores assigned to the items by the users as defined in Equation (1), and a symbol "-" positioned between the users and the items refer to a user that does not rate the item.

A user normalization array and an item normalization array are shown in (a) and (b) of FIG. 3, respectively. For example, when (5, 0, 0, 0, 1), which is the vector $U_1$ in (a) of FIG. 3, is normalized using Equation (2), (12.5, 0, 0, 0, 2.5) is obtained as shown in (b) of FIG. 3 by multiplying (5, 0, 0, 0, 1) by 2.5, which is 5, which is the number of elements, divided by 2, which is the number of elements evaluated. However, when (1, 0, 0, 0), which is the vector $I_5$ in (a) of FIG. 3, is normalized using Equation (2), (4, 0, 0, 0) is obtained as shown in (b) of FIG. 3 by multiplying (1, 0, 0, 0) by 4, which is 4, which is the number of elements, divided by 1, which is the number of elements evaluated.

Referring to FIG. 2 again, the normalization vector input processing unit 120 allows the input data normalization unit 110 to input a normalized vector to the modeling unit 200, which uses an artificial neural network algorithm, as input data of an artificial neural network. For example, for a value in the first row and fifth column in (a) of FIG. 3, (12.5, 0, 0, 0, 2.5), which is the normalized user vector $U_1$, and (4, 0, 0, 0), which is the normalized item vector $I_5$, are input to input nodes of the artificial neural network. In this case, according to an embodiment of the present invention, a row vector formed by sequentially connecting a user vector $U_u$ and an item vector $I_i$ is input to the input notes. For example, when (12.5, 0, 0, 0, 2.5), which is the normalized user vector $U_1$, and (4, 0, 0, 0), which is the normalized item vector $I_5$, are input to the artificial neural network, a row vector (12.5, 0, 0, 0, 2.5, 4, 0, 0, 0) obtained by sequentially connecting $U_1$ and $I_5$ may be input to the artificial neural network.

When a new user or item is added, pre-existing algorithms should perform new learning in response to the addition and adjust parameters. However, since a user vector and an item vector are used as an input of the artificial neural network as they are described above, there is no need to perform separate learning even when a new user or item is added. Thus, it is possible to simply perform rating prediction using a pre-learned model. Accordingly, the present invention is suitable for processing data in real time. This will be described below in detail with reference to FIGS. 7A and 7B.

Figure 4:
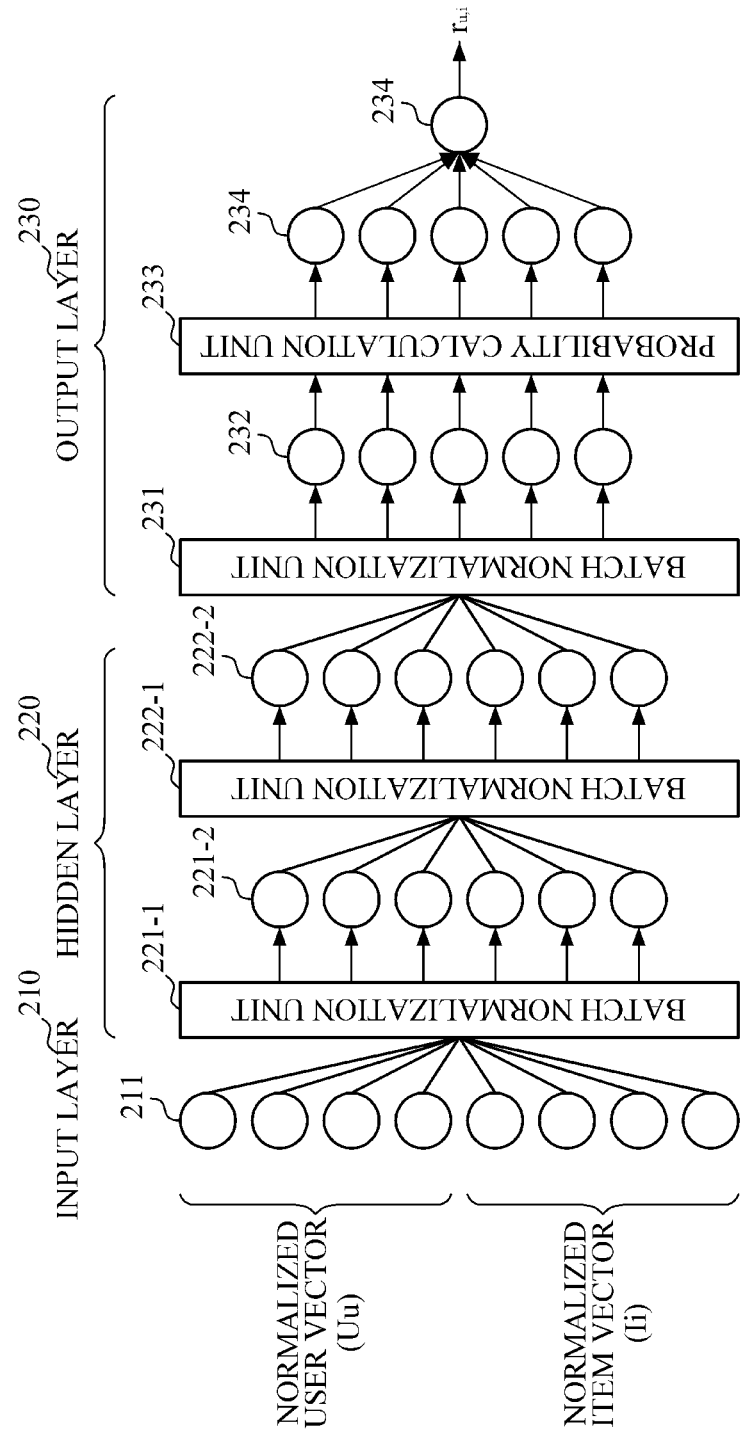
FIG. 4 is a diagram showing an example of an artificial neural network according to the present invention.

FIG. 4 is a diagram showing an example of an artificial neural network according to the present invention.

Referring to FIG. 4, an artificial neural network used in the modeling unit 200 is composed of an input layer 210, which is a bottom layer, an output layer 230, which is a top layer, and a hidden layer 220, which is positioned therebetween, and thus may model an artificial neural network model having a multilayer structure. Also, the hidden layer 220 may be designed as a multilayer having two or more layers.

Also, each of the layers is composed of multiple nodes 211, 221-2, 222-2, 232, and 234 corresponding to neurons of nervous tissue and weights connecting the nodes. The sum of outputs of the plurality of nodes multiplied by the weights is output to the next layer. Here, the weights may be input by a user and may be changed through machine learning on artificial neural network modeling. However, according to an embodiment of the present invention, the nodes 221-2, 222-2, and 232 of the hidden layer 220 and the output layer 230 receive values processed by batch normalization units 221-1, 222-1, and 231 as inputs. Batch normalization is a technique for normalizing a distribution of data input to each layer and is characterized by enhancing a learning speed and also preventing overfitting.

First, the input layer 210 will be described. Elements of a normalized user vector and elements of a normalized item vector are input to the plurality of input nodes 211. For example, for a value in the first row and fifth column in (a) of FIG. 3, (12.5, 0, 0, 0, 2.5), which is the normalized user vector $U_1$, and (4, 0, 0, 0), which is the normalized item vector $I_5$, are input to the input nodes 211 of the input layer 210. The values input to the input nodes 211 are multiplied by predetermined weights and then input to the hidden layer 220.

Next, the hidden layer 220 will be described. The hidden layer 220 may be a single layer having one node layer or a multilayer having two or more node layers. In FIG. 4, for convenience of description, the hidden layer 220 is shown as a multilayer composed of two layers, which are the hidden node layers 221-2 and 222-2. However, this is merely an example, and the present invention is not limited thereto.

Here, when an output of an $i^{th}$ hidden layer of the hidden layer 220 is $z_i$, $z_{i+1}$ is calculated by the following Equation (3).

$$z_{i+1} = ReLU(BN_{\gamma_i \beta_i}(W_i z_i)) \quad \text{[Equation 3]}$$

In the above Equation (3), $\gamma$, $\beta$, and W are all training parameters. However, when Equation (3) is described in terms of a meaning thereof, values obtained by multiplying $z_i$, which is a value output in a previous layer, by $W_i$, which is a weight, are input to the batch normalization units 221-1 and 222-1 shown in FIG. 4. That is, $BN_{\gamma,\beta}(x_i)$ in Equation (3) refers to batch normalization and may be defined by sequentially calculating Equations (4) to (7).

$$\mu_\beta = \frac{1}{m}\sum_{i=1}^{m} x_i \quad \text{[Equation 4]}$$

$$\sigma_\beta^2 = \frac{1}{m}\sum_{i=1}^{m}(x_i - \mu_\beta)^2 \quad \text{[Equation 5]}$$

$$\hat{x}_i = \frac{x_i - \mu_\beta}{\sqrt{\sigma_\beta^2 + \epsilon}} \quad \text{[Equation 6]}$$

$$y_1 = \gamma \hat{x}_i + \beta \equiv BN_{\gamma,\beta}(x_i) \quad \text{[Equation 7]}$$

That is, the batch normalization units 221-1 and 222-1 calculate a mini-batch mean $\mu_\beta$ of input values as shown in Equation (4), calculates a mini-batch variance $\sigma_\beta^2$ of the input values by using the calculated mini-batch mean $\mu_\beta$ as shown in Equation (5), finds normalized values $\hat{x}_i$ by using the calculated mini-batch variance $\sigma_\beta^2$ as shown in Equation (6), and finally calculates batch-normalized values $y_1$ by scaling the normalized values $\hat{x}_i$ by $\gamma$ and shifting the normalized values $\hat{x}_i$ by $\beta$ as shown in Equation (7). Since such a batch normalization technique is applied, there is no need to separately tune result values in order to solve the overfitting problem.

Then, the batch-normalized values are input to the hidden nodes 221-2 and 222-2, each of which performs an actuation function or a logistic function. According to an embodiment, a non-linear function ReLu defined in Equation (8) may be used. Even a complex model may be learned by using such a non-linear function. However, this is merely an example of the present invention, and the present invention is not limited thereto. That is, other actuation functions may be used.

$$ReLu(x)=\max(0,x) \quad \text{[Equation 8]}$$

As described above, values calculated by the actuation functions of the hidden nodes 221-2 and 222-2 are multiplied by weights and input to the next layer.

Next, when the output layer 230 will be described, like the hidden layer 220, a value output from the hidden layer 220 is converted into a batch-normalized value by applying the batch normalization unit 231 and input to a plurality of first output nodes 232, and values of the first output nodes 232 are calculated by a probability calculation unit 233 for finding a probability of each rating by using a softmax function and input to a plurality of second output nodes 234. An operation of the output layer 230 may be defined as the following Equation (9).

$$P=\text{softmax}(BN_{\gamma_L\beta_L}(W_L z_L)) \quad \text{[Equation 9]}$$

The softmax function in Equation (9) may be defined as the following Equation (10).

$$Softmax(x)_i = \frac{e^{x_i}}{\sum_i e^{x_i}} \quad \text{[Equation 10]}$$

A value $\tilde{R}_{i,j}$ is calculated by applying an output weight k to data allocated to the second output nodes 234 and arithmetically summing the data as shown in Equation (11).

$$\tilde{R}_{i,j} = \sum_k k \cdot P_k \quad \text{[Equation 11]}$$

Figure 5:
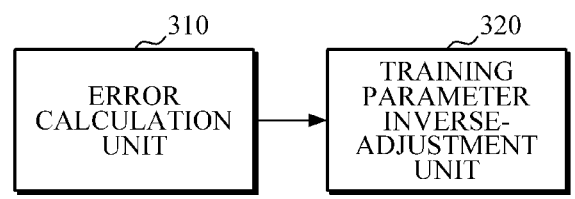
FIG. 5 is a detailed block diagram of an adjustment unit according to an embodiment of the present invention.

FIG. 5 is a detailed block diagram of an adjustment unit according to an embodiment of the present invention.

Referring to FIG. 5, in detail, the adjustment unit 300 includes an error calculation unit 310, a training parameter inverse-adjustment unit 320.

The error calculation unit 310 finds an error by applying the value $\tilde{R}_{i,j}$ calculated by the modeling unit 200 and an actually measured value or a target value $R_{i,j}$ to a loss function or a cost function that uses a mean square error (MSE) shown in Equation (12).

$$L = \frac{1}{|S_{train}|} \sum_{(i,j) \in S_{train}} (\tilde{R}_{i,j} - R_{i,j})^2 \quad \text{[Equation 12]}$$

For example, for "1," which is a value in the first row and fifth column in (a) of FIG. 3, when $\tilde{R}_{i,j}$ is output by inputting (12.5, 0, 0, 0, 2.5), which is the normalized user vector $U_1$, and (4, 0, 0, 0), which is the normalized item vector $I_5$, to input nodes of the artificial neural network, $R_{i,j}$ may correspond to "1."

Figure 6:
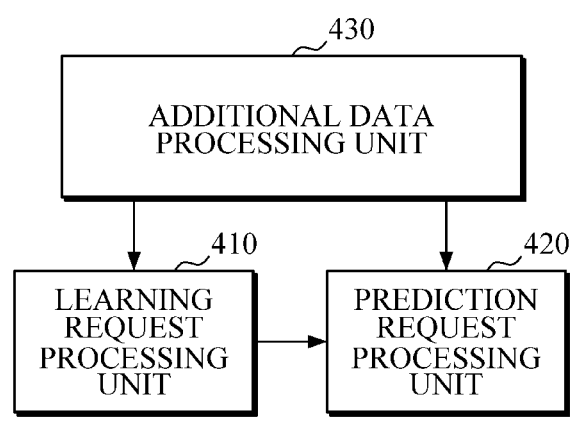
FIG. 6 is a detailed block diagram of a control unit according to an embodiment of the present invention.

The training parameter inverse-adjustment unit 320 relearns γ, β, and W, which are training parameters learned by the modeling unit 200, through a back-propagation algorithm to minimize a cost function. Here, the back-propagation algorithm refers to a machine learning process for estimating weights applied to a plurality of nodes and predefined bias values for layers in order to enhance reliability of prediction that uses an artificial neural network model. FIG. 6 is a detailed block diagram of a control unit according to an embodiment of the present invention.

Referring to FIG. 6, the control unit 400 includes a learning request processing unit 410 and a prediction request processing unit 420. Additionally, the control unit 400 may further include an additional data processing unit 430.

When learning data is input, the learning request processing unit 410 controls the input data conversion unit 100, the modeling unit 200, and the adjustment unit 300 to execute a model generation process. For example, the learning request processing unit 410 controls the input data conversion unit 100 to input normalized vector data corresponding to rated data among pieces of the learning data to the modeling unit 200 and controls the modeling unit 200 to learn the input vector data in conjunction with the adjustment unit 300. When the model generation process is complete, a prediction model is generated by the modeling unit 200.

When the prediction model is generated, the prediction request processing unit 420 controls the input data conversion unit 100 and the modeling unit 200 to execute a prediction process. For example, in order to predict an unrated value in the first row and second column in (a) of FIG. 3, the prediction request processing unit 420 controls the input data conversion unit 100 to input (12.5, 0, 0, 0, 2.5), which is the normalized user vector $U_1$, and (0, 6, 0, 2), which is the normalized item vector $I_2$, to the modeling unit 200, and the modeling unit 200 outputs a predicted value.

When the artificial-neural-network-based prediction model is modeled and then additional data is input, the additional data processing unit 430 generates an expansive L-dimensional array (L is a natural number) obtained by adding the additional data to input data and then controls the learning request processing unit 410 to perform prediction using the additional data. That is, the learning request processing unit 410 controls the input data conversion unit 100 and the modeling unit 200 to output predicted values as L vectors corresponding to element values included in the additional data desired to be predicted by the expansive L-dimensional array. In this case, the L vectors corresponding to the additional data have the same size as L vectors corresponding to the input data.

Also, when the artificial-neural-network-based prediction model is modeled and then additional data is input, the additional data processing unit 430 generates the expansive L-dimensional array (L is a natural number) obtained by adding the additional data to the input data and then controls the learning request processing unit 410 to perform learning using the additional data. That is, the learning request processing unit 410 controls the input data conversion unit 100 and the modeling unit 200 to output the predicted values as L vectors corresponding to element values included in the additional data desired to be learned by the expansive L-dimensional array. In this case, the L vectors corresponding to the additional data have the same size as the L vectors corresponding to the input data.

The additional data processing unit 430 may control the learning request processing unit 410 and the prediction request processing unit 420 to sequentially perform learning and prediction when the additional data is input, and the operations thereof are the same as described above.

Then, prediction and learning using additional data will be described below with reference to FIGS. 7A and 7B.

FIG. 7A is a diagram showing an example of prediction using additional data according to the present invention.

Referring to FIG. 7A, shaded data is input data that is initially used to train a model in the same way as described above, and the remaining data is data to which a new user or item is added. In this case, even when the new user or item is added as described above, it is possible to perform rating prediction on the additional data by using the model learned by the shaded data without needing to separately perform learning. When a rating value 710 corresponding to (U7, I6) is intended to be predicted, a user vector and an item vector having the same size as the shaded data are input to a trained prediction model. That is, a predicted value corresponding to (U7, I6) may be found by normalizing (3, 0, 5, 0), which is a user vector $U_7$, and (2, 0, 5, 0), which is an item vector $I_6$, and inputting (6, 0, 10, 0, 4, 0, 10, 0), which is a row vector obtained by connecting the two normalized vectors (6, 0, 10, 0) and (4, 0, 10, 0) in series, to an artificial neural network model.

FIG. 7B is a diagram showing an example of learning using additional data according to the present invention.

Referring to FIG. 7B, shaded data is input data that is initially used to train a prediction model in the same way as described above, and the remaining data is data to which a new user or item is added. However, it is possible to additionally learn a model learned by the shaded data by learning only the data to which the new user and item are added. That is, the model is learned by using data of the remaining rating part that is not displayed as "0." In this case, when a model is intended to be learned by using a rating value corresponding to ($U_5$, $I_3$), a user vector and an item vector having the same size as initial input data are input to a trained prediction model. That is, it is possible to allow the predicted model to learn the additional data by normalizing (3, 0, 5, 0), which is a user vector $U_5$, and (5, 0, 1, 0), which is an item vector $I_3$, and inputting (6, 0, 10, 0, 10, 0, 2, 0), which is a row vector obtained by connecting the two normalized vectors (6, 0, 10, 0) and (10, 0, 2, 0) in series, to an artificial neural network.

Figure 8:
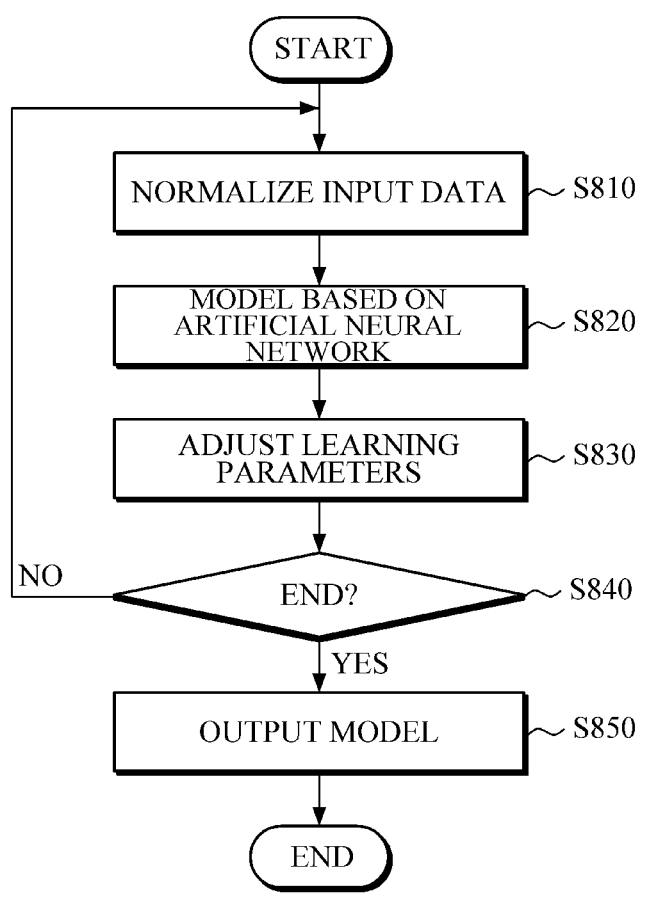
FIG. 8 is a flowchart for illustrating an artificial-neural-network-based prediction model generation method according to an embodiment of the present invention.

FIG. 8 is a flowchart for illustrating an artificial-neural-network-based prediction model generation method according to an embodiment of the present invention.

Referring to FIG. 8, an artificial-neural-network-based prediction model generation apparatus (hereinafter referred to as an "apparatus") converts array input data into a normalized vector and inputs the normalized vector to an artificial neural network (S810). For example, the apparatus converts each element of an array consisting of scores obtained by users evaluating items into a user vector and an item vector, and inputs the user vector and the item vector to the artificial neural network. In this case, since a different number of items are evaluated by each user and also each item is evaluated by a different number of users, the apparatus normalizes each user vector and each item vector in order to compensate for such an imbalance. This will be described below in detail with reference to FIG. 9. Next, the artificial neural network receives the normalized vectors and generates a prediction model using an artificial neural network algorithm (S820). According to an embodiment of the present invention, a batch normalization technique is used to prevent overfitting of the input data. That is, the artificial neural network is composed of an input layer, a hidden layer, and an output layer. The batch normalization is performed between the input layer and the hidden layer, between hidden layers, and between the hidden layer and the output layer at least one or more times. This will be described below in detail with reference to FIG. 10.

Finally, the apparatus compares an output value that is output by the artificial neural network with an actually measured value to calculate an error value, and adjusts a learning parameter of the modeling unit 200 using the error value and a back-propagation algorithm (S830).

As described above, when a prediction model generation process is complete (S840), the apparatus outputs the generated prediction model (S850). Although not shown, the apparatus may predict an output value for a predetermined input value through the generated prediction model. For example, in order to predict an unrated value in the first row and second column in (a) of FIG. 3, a predicted value may be output when (12.5, 0, 0, 0, 2.5), which is the normalized user vector $U_1$, and (0, 6, 0, 2), which is the normalized item vector $I_2$, are input to an artificial-neural-network-based model.

Figure 9:
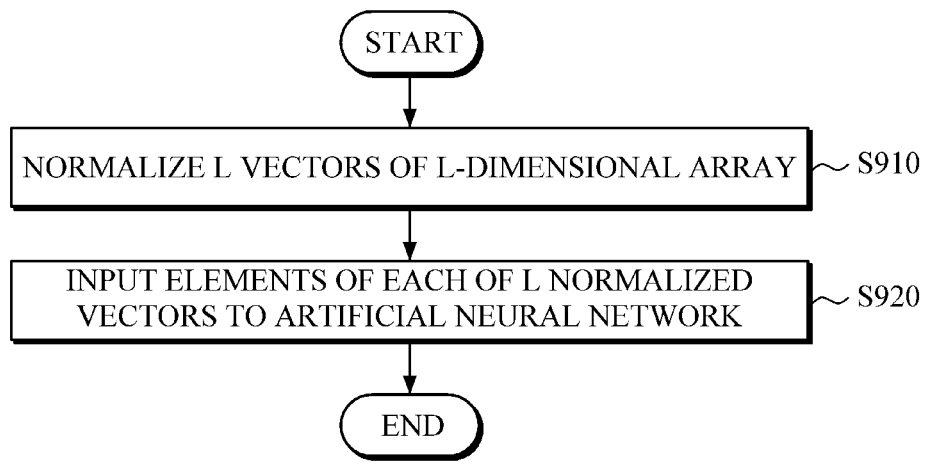
FIG. 9 is a flowchart for illustrating input data conversion according to an embodiment of the present invention.

FIG. 9 is a flowchart for illustrating input data conversion according to an embodiment of the present invention. Here, the input data conversion step S820 is described as an element of the artificial-neural-network-based prediction model generation method, but the input data conversion step S820 may be configured as a separate artificial-neural-network input data conversion method for processing input data of an artificial neural network.

Referring to FIG. 9, the apparatus normalizes L vectors corresponding to predetermined element values of an L-dimensional array (here, L is a natural number), which is learning data (S910). For example, as shown in (a) of FIG. 3, the apparatus normalizes the two vectors $U_u$ and $I_i$ having two-dimensional matrices in the above Equation (2). That is, the apparatus multiplies the total number of elements of the vector by a length of the vector divided by the number of non-zero elements.

Figure 10B:
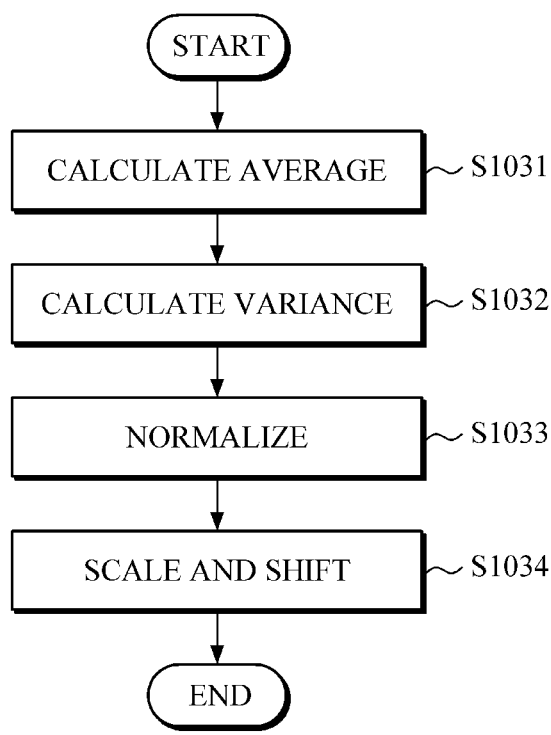

Then, the apparatus inputs elements of each of the L normalized vectors as input data of an artificial neural network (S920). For example, for a value in the first row and fifth column in (a) of FIG. 3, (12.5, 0, 0, 0, 2.5), which is the normalized user vector $U_1$, and (4, 0, 0, 0), which is the normalized item vector $I_5$, are input to input nodes of the artificial neural network. In this case, according to an embodiment of the present invention, a row vector formed by sequentially connecting the user vector $U_u$ and the item vector $I_i$ is input to the input notes. For example, when (12.5, 0, 0, 0, 2.5), which is the normalized user vector $U_1$, and (4, 0, 0, 0), which is the normalized item vector $I_5$, are input to the artificial neural network, a row vector (12.5, 0, 0, 0, 2.5, 4, 0, 0, 0) obtained by sequentially connecting $I_5$ and $U_1$ may be input to the artificial neural network. When a new user or item is added, pre-existing algorithms should perform new learning in response to the addition and adjust parameters. However, since a user vector and an item vector are used as inputs of the artificial neural network as described above, there is no need to perform separate learning even when a new user or item is added. Thus, it is possible to simply perform rating prediction using a pre-learned model. Accordingly, the present invention is suitable for processing data in real time. FIGS. 10A and 10B are flowcharts for illustrating an artificial-neural-network-based modeling method according to an embodiment of the present invention.

Referring to FIG. 10A, the apparatus assigns elements of normalized vectors to a plurality of input nodes (S1010). For example, for a value in the first row and fifth column in (a) of FIG. 3, (12.5, 0, 0, 0, 2.5), which is the normalized user vector $U_1$, and (4, 0, 0, 0), which is the normalized item vector $I_5$, are input. Then, the apparatus applies predetermined weights to the input values (S1020).

Then, the apparatus batch-normalizes result values to which the predetermined weights are applied (S1030). Referring to FIG. 8B in detail, the apparatus calculates a mini-batch mean $\mu_\beta$ of input values as shown in Equation (4) (S1031), calculates a mini-batch variance $\sigma_\beta^2$ of the input values by using the calculated mini-batch mean $\mu_\beta$ as shown in Equation (5) (S1032), finds normalized values $\hat{x}_i$ by using the calculated mini-batch variance $\sigma_\beta^2$ as shown in Equation (6) (S1033), and finally calculates batch-normalized values $y_1$ by scaling the normalized values $\hat{x}_i$ by $\gamma$ and shifting the normalized values $\hat{x}$; by $\beta$ as shown in Equation (7) (S1034). Since such a batch normalization technique is applied, there is no need to separately tune result values in order to solve the overfitting problem.

Then, the apparatus applies an actuation function or a logistic function to each of the batch-normalized values (S1040). According to an embodiment, the non-linear function ReLu defined as Equation (8) may be used. Even a complex model may be learned by using such a non-linear function.

The apparatus applies weights to values calculated by the actuation function (S1050) and then inputs the values to the next layer (S1060).

The apparatus determines whether the next layer is a hidden node (S1070). The apparatus returns to S1030 when the next layer is a hidden node and proceeds to S1070 when the next layer is not a hidden node.

Like S1030, the apparatus converts output values into batch-normalized values (S1070). Then, the apparatus calculates a probability of each rating by applying a softmax function to the converted values (S1080). Also, the apparatus applies an output weight k to the values as shown in the following Equation (11) and then calculates an arithmetically summed value thereof (S1090).

Figure 11:
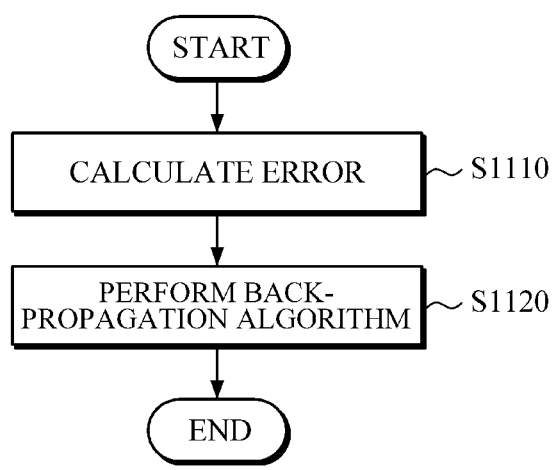
FIG. 11 is a flowchart for illustrating an adjustment step according to an embodiment of the present invention.

FIG. 11 is a flowchart for illustrating an adjustment step according to an embodiment of the present invention.

Referring to FIG. 11, the apparatus finds an error by applying a value calculated by an artificial neural network and an actually measured value or a target value to a loss function or a cost function that uses an MSE as shown in Equation (12) (S1110).

Then, the apparatus relearns $\gamma$, $\beta$, and W, which are training parameters learned by the artificial neural network, through a back-propagation algorithm to minimize a cost function (S1120). Here, the back-propagation algorithm refers to a machine learning process for estimating weights applied to a plurality of nodes and predefined bias values for layers in order to enhance reliability of a prediction that uses an artificial neural network model.

Also, although not shown, when the artificial-neural-network-based prediction model is modeled and then additional data is input, the apparatus may generate an expansive L-dimensional array (L is a natural number) obtained by adding the additional data to input data, and then may perform control to re-perform conversion and prediction to output predicted values as L vectors corresponding to element values included in additional data intended to be predicted by the L-dimensional array. In this case, the L vectors corresponding to the additional data have the same size as L vectors corresponding to the input data.

Also, although not shown, when the artificial-neural-network-based prediction model is modeled and then the additional data is input, the apparatus may generate the expansive L-dimensional array (L is a natural number) obtained by adding the additional data to input data and then may perform control to re-perform conversion, modeling, and adjustment to additionally learn the prediction model with L vectors corresponding to element values included in the additional data intended to be learned by the L-dimensional array. The L vectors corresponding to the additional data have the same size as the L vectors corresponding to the input data.

According to the present invention, it is possible to learn a complex model by applying the non-linear function ReLu between layers of an artificial neural network. There is no need for separate tuning because a batch normalization technique is applied.

Also, when a new user or item is added, pre-existing learning algorithms using an artificial neural network should perform new learning in response to the addition and adjust parameters. However, according to the present invention, a user vector and an item vector are used as an input as they are, and thus there is no need to perform separate learning even when a new user or item is added. That is, it is possible to simply perform a rating prediction using a pre-learned model, and thus the present invention is suitable for processing data in real time.

What is claimed is:

1. An apparatus for generating an artificial-neural-network-based prediction model, the apparatus comprising:
a processor configured to:
convert input data of a sparse L-dimensional array into normalized vector data, where L is a natural number that is 2 or higher, wherein
the input data is converted by normalizing L vectors corresponding to predetermined element values of the L-dimensional array,
the L vectors include vectors along different respective dimensions of the L-dimensional array, and
for each of the L vectors, the L vector is normalized by multiplying a number of elements in the L vector divided by a number of elements in the L vector greater than zero;
model an artificial-neural-network-based prediction model for learning the input vector data and output a value predicted through the model to create an artificial neural network that is a pre-learned model;
compare the value predicted with an actually measured value to calculate an error value and adjust learning parameters of the artificial neural network using the error value and a back-propagation algorithm;
input the normalized vector data into the artificial neural network; and
generate an L-expansive dimensional array using the pre-learned model when additional data is input by adding the additional data to the input data and output a predicted value as L vectors corresponding to element values included in additional data intended to be predicted by the L-dimensional array.

2. The apparatus of claim 1, wherein the processor comprises:
an input data converter configured to convert the input data of the L-dimensional array into the normalized vector data and input the normalized vector data;
a modeler configured to model the artificial-neural-network-based prediction model for the learning of the input vector data and output the value predicted through the model to create the pre-learned model;
an adjuster configured to compare the value predicted by the modeler with the actually measured value to calculate the error value and adjust learning parameters of the artificial neural network using the error value and the back-propagation algorithm; and a controller configured to generate the L-expansive dimensional array using the pre-learned model when the additional data is input by adding the additional data to the input data and control the input data converter and the modeler to output the predicted value as the L vectors corresponding to the element values included in the additional data intended to be predicted by the L-dimensional array.

3. The apparatus of claim 2, wherein the input data converter comprises:
an input data normalizer configured to normalize the L vectors corresponding to predetermined element values of the L-dimensional array; and
a normalization vector input processor configured to input the L vectors to the artificial neural network,
wherein the controller is further configured to control the input data converter and the modeler to generate the L-expansive dimensional array, and wherein the L vectors corresponding to the additional data have the same size as L vectors corresponding to the input data.

4. The apparatus of claim 3, wherein the normalization vector input processor inputs a row vector formed by sequentially connecting the L vectors to the artificial neural network.

5. The apparatus of claim 3, wherein the controller is further configured to control the input data converter, the modeler, and the adjuster to generate the L-expansive dimensional array and additionally learn the prediction model with L vectors corresponding to element values included in the additional data intended to be learned by the L-dimensional array, wherein
the L vectors corresponding to the additional data have the same size as L vectors corresponding to the input data.

6. An apparatus for converting data to be input to an artificial neural network, the apparatus comprising:
a processor configured to:
normalize L vectors corresponding to predetermined element values of a sparse L-dimensional array, where L is a natural number that is 2 or higher, wherein
the L vectors include vectors along different respective dimensions of the L-dimensional array, and
for each of the L vectors, the L vector is normalized by multiplying a number of elements in the L vector divided by a number of elements in the L vector greater than zero;
input the normalized L vectors to the artificial neural network; and
generate an L-expansive dimensional array using a pre-learned model when additional data is input by adding the additional data to input data and output a predicted value as L vectors corresponding to element values included in additional data intended to be predicted by the L-dimensional array.

7. The apparatus of claim 6, wherein the processor comprises:
an input data normalizer configured to normalize the L vectors corresponding to the predetermined element values of the L-dimensional array;
a normalization vector input processor configured to input the L vectors to the artificial neural network; and
a controller configured to generate the L-expansive dimensional array using the pre-learned model when the additional data is input by adding the additional data to the input data, and control the input data normalizer and the normalization vector input processor to output the predicted value as the L vectors corresponding to the element values included in the additional data intended to be the predicted by the L-dimensional array.

8. The apparatus of claim 2, wherein the normalization vector input processor inputs a row vector formed by sequentially connecting the L vectors to the artificial neural network.

9. A method of generating an artificial-neural-network-based prediction model, the method comprising:
converting input data of a sparse L-dimensional array into normalized vector data, where L is a natural number that is 2 or higher, wherein
the input data is converted by normalizing L vectors corresponding to predetermined element values of the L-dimensional array,
the L vectors include vectors along different respective dimensions of the L-dimensional array, and
for each of the L vectors, the L vector is normalized by multiplying a number of elements in the L vector divided by a number of elements in the L vector greater than zero;
modeling an artificial-neural-network-based prediction model for learning the normalized vector data and outputting a value predicted through the modeling;
comparing the value predicted by the modeling with an actually measured value to calculate an error value and adjusting learning parameters of the artificial neural network using the error value and a back-propagation algorithm;
inputting the normalized vector data into the artificial neural network; and
performing control to re-perform the converting and the outputting to generate an L-expansive dimensional array obtained by adding additional data to the input data and output a predicted value as L vectors corresponding to element values included in additional data intended to be predicted by the L-dimensional array.

10. The method of claim 9, wherein the outputting comprises batch-normalizing a data distribution between an input layer and a hidden layer of the artificial neural network, between hidden layers of the artificial neural network, and between the hidden layer and an output layer of the artificial neural network at least one time.

11. The method of claim 10, wherein the outputting comprises:
calculating an average of input values;
calculating a variance of the input values using the average;
calculating normalized values using the variance; and
calculating batch-normalized values by scaling and shifting the normalized values.

12. The method of claim 10, wherein the outputting comprises applying a non-linear function to the batch-normalized values in the hidden layer.

13. The method of claim 10, wherein the outputting comprises:
applying a softmax function to the batch-normalized values in the output layer to calculate respective probabilities of ratings; and
outputting the predicted value by applying weights to the probabilities to calculate weighted probabilities, and summing the weighted probabilities.

14. The method of claim 9,
wherein the L vectors corresponding to the additional data have the same size as L vectors corresponding to the input data.

15. The method of claim 14, wherein the inputting comprises inputting a row vector formed by sequentially connecting the L vectors to the artificial neural network.

16. The method of claim 14, further comprising, when the artificial-neural-network-based prediction model is modeled and then additional data is input, performing control to re-perform the converting, the outputting, and the adjusting to generate an L-expansive dimensional array, obtained by adding the additional data to the input data and additionally learn the prediction model by using L vectors corresponding to element values included in additional data intended to be learned by the L-dimensional array, wherein the L vectors corresponding to the additional data have the same size as L vectors corresponding to the input data.

17. A method of converting data to be input to an artificial neural network, the method comprising:
  normalizing L vectors corresponding to predetermined element values of a sparse L-dimensional array, where L is a natural number that is 2 or higher, wherein
    the L vectors include vectors along different respective dimensions of the L-dimensional array, and
    for each of the L vectors, the L vector is normalized by multiplying a number of elements in the L vector divided by a number of elements in the L vector greater than zero; and
  inputting the normalized L vectors to the artificial neural network; and
  performing control to re-perform the normalizing to generate an L-expansive dimensional array obtained by adding additional data to input data and output a predicted value as L vectors corresponding to element values included in additional data intended to be predicted by the L-dimensional array.

18. The method of claim 17, wherein the inputting comprises inputting a row vector formed by sequentially connecting the L vectors to the artificial neural network.

* * * * *